(12) United States Patent
Aoyagi et al.

(10) Patent No.: US 7,527,112 B2
(45) Date of Patent: May 5, 2009

(54) ELECTRIC SYSTEM FOR FUEL CELL, FUEL CELL VEHICLE, AND METHOD OF SUPPLYING ELECTRIC POWER

(75) Inventors: Satoshi Aoyagi, Shimotsuke (JP); Hibiki Saeki, Utsunomiya (JP); Kuniaki Ojima, Yuki (JP)

(73) Assignee: Honda Motor Co., Ltd., Tokyo (JP)

( * ) Notice: Subject to any disclaimer, the term of this patent is extended or adjusted under 35 U.S.C. 154(b) by 368 days.

(21) Appl. No.: 11/396,194

(22) Filed: Mar. 31, 2006

(65) Prior Publication Data
US 2006/0222909 A1 Oct. 5, 2006

(30) Foreign Application Priority Data
Mar. 31, 2005 (JP) ............................. 2005-102559

(51) Int. Cl.
*B60K 1/00* (2006.01)
(52) U.S. Cl. ................ 180/65.3; 180/65.2; 180/65.8; 903/944
(58) Field of Classification Search ................ 180/65.3, 180/65.1, 65.8, 65.2; 429/9, 12, 13, 22; 307/43, 307/45, 64; 320/104, 116, 118; 903/944, 903/903
See application file for complete search history.

(56) References Cited

U.S. PATENT DOCUMENTS

| | | | |
|---|---|---|---|
| 5,334,463 A * | 8/1994 | Tajima et al. ................... | 429/9 |
| 5,560,218 A | 10/1996 | Jang et al. | |
| 6,158,537 A * | 12/2000 | Nonobe ...................... | 180/65.3 |
| 6,244,368 B1 | 6/2001 | Ando et al. | |
| 6,255,008 B1 * | 7/2001 | Iwase ............................. | 429/9 |
| 6,321,145 B1 * | 11/2001 | Rajashekara ............... | 180/65.3 |
| 6,428,917 B1 * | 8/2002 | Lacy et al. ..................... | 429/13 |
| 6,628,011 B2 * | 9/2003 | Droppo et al. ................. | 307/43 |
| 6,645,653 B2 * | 11/2003 | Kashiwagi .................... | 429/22 |
| 6,646,413 B2 * | 11/2003 | Autenrieth et al. .......... | 320/101 |

(Continued)

FOREIGN PATENT DOCUMENTS

JP 2002-118981 4/2002

(Continued)

OTHER PUBLICATIONS

Maxim, "DC-DC Converter Tutorial," retrieved online at http://www.maxim-ic.com/appnotes.cfm/appnote_number/2031/ (2000).

(Continued)

*Primary Examiner*—Hau V Phan
(74) *Attorney, Agent, or Firm*—Lahive & Cockfield LLP; Anthony A. Laurentano

(57) ABSTRACT

An electric system has a fuel cell and an electric storage device which are connected in parallel to each other with respect to a propulsive motor, and a DC-to-DC converter connected closer to the electric storage device than a junction where the fuel cell and the electric storage device are connected in parallel to each other. An electric power control system includes a power supply controller having a failure detector for detecting a failure of the DC-to-DC converter. When the failure detector detects a failure of the DC-to-DC converter, the response of electric power output from the fuel cell is limited.

9 Claims, 14 Drawing Sheets

U.S. PATENT DOCUMENTS

| | | | |
|---|---|---|---|
| 6,777,909 B1 * | 8/2004 | Aberle et al. | 320/104 |
| 6,847,127 B1 * | 1/2005 | Lee | 290/40 C |
| 6,920,948 B2 | 7/2005 | Sugiura et al. | |
| 6,960,400 B2 * | 11/2005 | Hara et al. | 429/12 |
| 7,091,625 B2 * | 8/2006 | Okusawa et al. | 320/104 |
| 7,244,524 B2 * | 7/2007 | McCluskey et al. | 429/9 |
| 2004/0136211 A1 | 7/2004 | Itou | |

FOREIGN PATENT DOCUMENTS

| | | |
|---|---|---|
| JP | 2003-153461 | 5/2003 |
| JP | 2004-180461 | 6/2004 |
| JP | 2004-193063 | 7/2004 |
| JP | 2004-222376 | 8/2004 |
| JP | 2004-234907 | 8/2004 |

OTHER PUBLICATIONS

U.S. Office Action for U.S. Appl. No. 11/395,675, dated Jan. 10, 2008.

U.S. Appl. No. 11/395,675, filed Mar. 31, 2006, Aoyagi, Satoshi.

U.S. Appl. No. 12/203,616, filed Sep. 3, 2008.

U.S. Appl. No. 12/203,688, filed Sep. 3, 2008.

\* cited by examiner

ELECTRIC SYSTEM FOR FUEL CELL, FUEL CELL VEHICLE, AND METHOD OF SUPPLYING ELECTRIC POWER

BACKGROUND OF THE INVENTION

1. Field of the Invention

The present invention relates to an electric system for a fuel cell, a fuel cell vehicle, and a method of supplying electric power, and more particularly to an electric system in which a fuel cell and an electric storage device are connected in parallel to each other with respect to a load and connected to the load, and a DC-to-DC converter is connected closer to the electric storage device than the junction where the fuel cell and the electric storage device are connected in parallel to each other, a fuel cell vehicle incorporating such an electric system, and a method of supplying electric power in such an electric system.

2. Description of the Related Art

Recently, fuel cell vehicles carrying fuel cells, which are of excellent fuel efficiency and environment-friendly nature, as propulsive power sources have been developed and put to practical use. Fuel cells for use on fuel cell vehicles are often high-voltage fuel cells because they are required to generate large electric power to provide sufficient drive forces to propel the fuel cell vehicles.

Some fuel cell vehicles also carry electric storage devices for assisting in supplying electric power to meet high loads and load variations and also for storing regenerated electric power.

If the voltage generated by a fuel cell and the rate voltage of an electric storage device are different from each other, then a DC-to-DC converter for performing bidirectional voltage conversion is connected between a power supply line connected to the fuel cell and a power supply line connected to the electric storage device. The DC-to-DC converter allows electric power to be efficiently transferred between the fuel cell and the electric storage device and also allows regenerated electric power to be efficiently stored in the electric storage device.

Fuel cell vehicles incorporate fuel cell accessories for operating fuel cells, i.e., an air compressor, a hydrogen supply pump, a coolant circulation pump, etc., in addition to ordinary motor vehicle accessories including an air conditioner, windshield wipers, power window motors, etc.

One type of connections used for supplying electric power to motor vehicle accessories and fuel cell accessories on fuel cell vehicles is disclosed in Japanese Laid-Open Patent Publication No. 2004-193063. As shown in FIG. 13 of the accompanying drawings, the disclosed system has a power supply line 3 interconnecting a fuel cell 1 and an inverter 2, and power supply lines are branched from the power supply line 3 for supplying electric power to a motor vehicle accessory 4 and a fuel cell accessory 5. The power supply line 3 carries a high voltage suitable for energizing an electric motor. The electric power from the power supply line 3 is reduced in voltage by a DC-to-DC converter 7 before it is supplied to an electric storage device 6. The DC-to-DC converter 7 is capable of converting voltages bidirectionally.

Japanese Laid-Open Patent Publication No. 2002-118981 discloses another system of connections as shown in FIG. 14 of the accompanying drawings. As shown in FIG. 14, a power supply line 8 interconnects an electric storage device 6 and a DC-to-DC converter 7, and power supply lines are branched from the power supply line 8 for supplying electric power to a motor vehicle accessory 4 and a fuel cell accessory 5. The power supply line 8 is of a low voltage because the voltage carried thereby is reduced by the DC-to-DC converter 7 to a value lower than the voltage carried by a power supply line 3 interconnecting a fuel cell 1 and an inverter 2.

If accessories are to be added to the system disclosed in Japanese Laid-Open Patent Publication No. 2002-118981, then they are connected to the low-voltage power supply line 8 that is connected to the electric storage device 6 shown in FIG. 14. However, the system with the added accessories is disadvantageous in that if the DC-to-DC converter fails and the electric power generated by the fuel cell cannot be supplied to the low-voltage power supply line 8, the distance that the fuel cell vehicle is able to travel thereafter will be shortened. Specifically, since the fuel cell needs to be supplied with a reactive gas for its operation, it is necessary to operate an air compressor, pumps, etc. However, as these accessories are connected to the low-voltage power supply line, they are energized by only the electric power which remains in the electric storage device. Consequently, even if a sufficient amount of hydrogen gas is stored in the fuel tank, since no electric power is obtained from the stored hydrogen gas for actuating the air compressor and the pumps, the fuel cell is shut off at the time the discharge of electric power from the electric storage device is finished. In addition, inasmuch as the air compressor and the pumps consume a relatively large amount of electric power if the DC-to-DC converter fails, the electric storage device discharges the stored electric power at a high rate and cannot be operated continuously for a long period of time.

In either one of the systems disclosed in Japanese Laid-Open Patent Publication No. 2004-193063 and Japanese Laid-Open Patent Publication No. 2002-118981, the fuel cell is liable to be deteriorated if the fuel cell vehicle continues to travel in the event of a DC-to-DC converter failure. Specifically, though the amount of electric power generated by the fuel cell is set depending on the amounts of a fuel gas and a reactive gas that are supplied, there are limitations to sudden changes in the supplied amounts of the fuel gas and the reactive gas because of fluid inertia, piping resistances and air compressor dynamic characteristics, possibly causing the system to fail to respond to a required change in the electric power, i.e., to fail to be sufficiently responsive. If the DC-to-DC converter suffers a failure, as no assistive electric current is supplied from the electric storage device, the fuel cell needs to generate electric power in excess of an allowable change in electric power, resulting in insufficient capabilities of the pumps for supplying the fuel gas and the reactive gas. As a consequence, the fuel cell operates under shortage of gas, and is liable to be deteriorated.

Once the fuel cell is deteriorated, it is difficult to restore. Consequently, even when the faulty DC-to-DC converter is repaired, the fuel cell remains deteriorated, and is liable to have its power generating ability lowered and also have its service life reduced.

SUMMARY OF THE INVENTION

It is an object of the present invention to provide an electric system including a fuel cell and a DC-to-DC converter, which system is capable of avoiding a gas shortage in the fuel cell even in the event of a failure of the DC-to-DC converter thereby to prevent the fuel cell from being deteriorated, a fuel cell vehicle incorporating such an electric system, and a method of supplying electric power in such an electric system.

According to the present invention, there is provided an electric system for a fuel cell in which the fuel cell and an electric storage device are connected in parallel to each other with respect to a load, comprising a DC-to-DC converter connected closer to the electric storage device than a junction where the fuel cell and the electric storage device are connected in parallel to each other, failure detecting means for detecting a failure of the DC-to-DC converter, and response limiting means for limiting the response of electric power output from the fuel cell when the failure detecting means detects a failure of the DC-to-DC converter.

According to the present invention, there is also provided a fuel cell vehicle for being propelled by a propulsive motor, the fuel cell vehicle having an electric system in which a fuel cell and an electric storage device are connected in parallel to each other with respect to the propulsive motor and connected to the propulsive motor through a power converter, comprising a DC-to-DC converter connected closer to the electric storage device than a junction where the fuel cell and the electric storage device are connected in parallel to each other, reactive gas supply means for supplying a reactive gas to the fuel cell, failure detecting means for detecting a failure of the DC-to-DC converter, and response limiting means for limiting the response of electric power output from the fuel cell when the failure detecting means detects a failure of the DC-to-DC converter.

According to the present invention, there is further provided a fuel cell vehicle for being propelled by a propulsive motor, the fuel cell vehicle having an electric system in which a fuel cell and an electric storage device are connected in parallel to each other with respect to the propulsive motor and connected to the propulsive motor through a power converter, comprising a DC-to-DC converter connected closer to the electric storage device than a junction where the fuel cell and the electric storage device are connected in parallel to each other, reactive gas supply means for supplying a reactive gas to the fuel cell, failure detecting means for detecting a failure of the DC-to-DC converter, and protection control means for protecting the fuel cell when the failure detecting means detects a failure of the DC-to-DC converter.

According to the present invention, there is still further provided a method of supplying electric power in an electric system in which a fuel cell and an electric storage device are connected in parallel to each other with respect to the propulsive motor and connected to the propulsive motor through a power converter, and a DC-to-DC converter is connected closer to the electric storage device than a junction where the fuel cell and the electric storage device are connected in parallel to each other, comprising the steps of (a) supplying a reactive gas to the fuel cell, (b) detecting a failure of the DC-to-DC converter, and (c) limiting the response of electric power output from the fuel cell when a failure of the DC-to-DC converter is detected in the detecting step (b).

As described above, when a failure of the DC-to-DC converter is detected, the response of electric power output from the fuel cell is limited, thereby avoiding a gas shortage in the fuel cell even if there is no assistive electric current from the electric storage device, so that the fuel cell is prevented from being unduly deteriorated. The protection control means protects the fuel cell by limiting the response of the fuel cell and also by limiting the output thereof and limiting a regenerative process.

The response limiting means or limiting step may set an allowable output change upon the failure of the DC-to-DC converter to a value smaller than an allowable output change when the DC-to-DC converter is normal. With the allowable output change being thus set, the response of the electric power can easily be limited.

The reactive gas supply means may comprise a pump for delivering the reactive gas, and an electric motor for actuating the pump, or in the supplying step, the reactive gas may be delivered by a pump, and the pump may be actuated by an electric motor, and the electric motor may be supplied with electric power from a power supply line having the junction. In order to continue operating the fuel cell, the electric motor for the pump has to be energized. Since the electric motor for the pump is connected to the power supply line having the junction, the electric motor is supplied with electric power from the fuel cell, and in the event of a failure of the DC-to-DC converter, the propulsive motor is energized regardless of the storage capacity of the electric storage device. Therefore, the electric storage device may have its capacity determined without regard to a failure in the DC-to-DC converter, and may be reduced in size.

The allowable output change may comprise an allowable torque change of the propulsive motor, making it easier to adjust drivability of the fuel cell vehicle as it travels compared to when changes in the output electric power are limited.

The fuel cell vehicle may further comprise regenerative electric power limiting means for limiting regenerative electric power of the propulsive motor to a value equal to or smaller than a prescribed failure regenerative electric power limit value upon the failure of the DC-to-DC converter. The method may further comprise the step of (d) limiting regenerative electric power of the propulsive motor to a value equal to or smaller than a prescribed failure regenerative electric power limit value upon the failure of the DC-to-DC converter. In this manner, the electric system is prevented from producing an overvoltage.

The regenerative electric power limiting means may comprise means for calculating an allowable motor regenerative electric power upper limit value of the propulsive motor based on a voltage in the electric system, and means for limiting the regenerative electric power of the propulsive motor to a value equal to or smaller than a smaller one of the failure regenerative electric power limit value and the allowable motor regenerative electric power upper limit value. The limiting step (d) may comprise the steps of calculating an allowable motor regenerative electric power upper limit value based on a voltage in the electric system, and limiting the regenerative electric power of the propulsive motor to a value equal to or smaller than a smaller one of the failure regenerative electric power limit value and the allowable motor regenerative electric power upper limit value. In this manner, the electric system is reliably protected from being influenced by temperature, etc.

The fuel cell vehicle may further comprise vehicle accessory electric power limiting means for limiting at least part of electric power consumed by a vehicle accessory upon the failure of the DC-to-DC converter. The method may further comprise the step of limiting at least part of electric power consumed by a vehicle accessory upon the failure of the DC-to-DC converter. The electric power consumed by the vehicle accessory can be utilized to propel the fuel cell vehicle, allowing the fuel cell vehicle to travel a longer distance in the event of a failure of the DC-to-DC converter.

The vehicle accessory may comprise an electrically operated air conditioner motor. Since the electrically operated air conditioner motor consumes a large amount of electric power among the vehicle accessories, when the electric power consumed by the electrically operated air conditioner motor is limited, the distance that the fuel cell vehicle can travel in the event of a failure in the DC-to-DC converter is increased.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An electric system for a fuel cell, a fuel cell vehicle, and a method of supplying electric power according to an embodiment of the present invention will be described below with reference to FIGS. 1 through 12.

Figure 1:
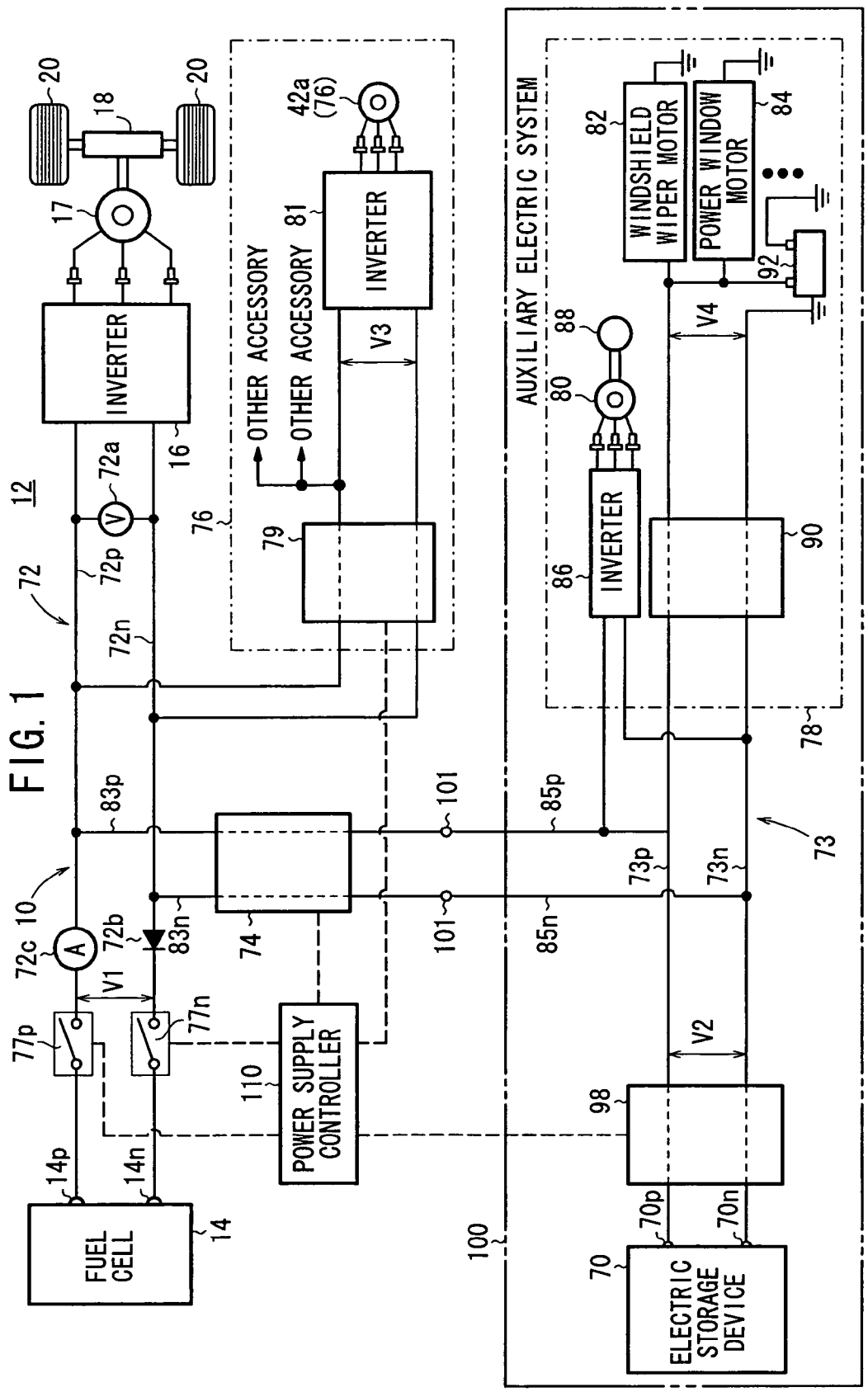
FIG. 1 is a block diagram of an electric system for a fuel cell according to an embodiment of the present invention.

As shown in FIG. 1, the electric system, generally denoted by 10, is mounted on a fuel cell vehicle 12. On the fuel cell vehicle 12, electric power generated by a fuel cell 14 is supplied through an inverter (power converter) 16 to control a three-phase propulsive motor 17 to rotate its rotatable shaft, causing a gear mechanism 18 including a differential gear and a transmission connected to the rotatable shaft of the electric motor 17 to rotate drive wheels 20. The fuel cell 14 comprises a large-power, high-voltage fuel cell for generating large electric power to provide sufficient drive forces to propel the fuel cell vehicle 12. The fuel cell generates a voltage V1.

Figure 2:
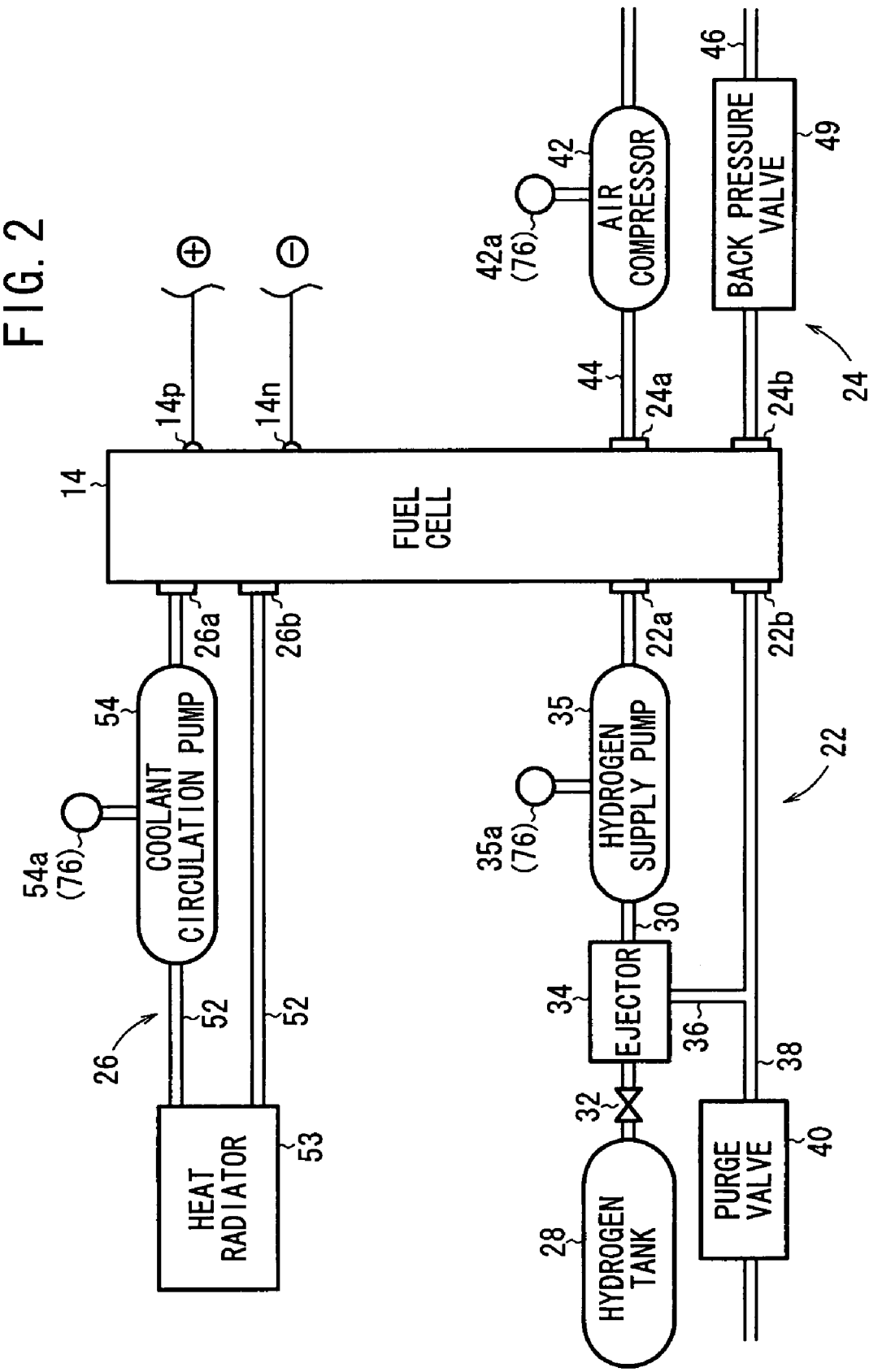
FIG. 2 is a block diagram of a fuel cell system.

As shown in FIG. 2, a fuel gas supply system 22, a reactive gas supply system (reactive gas supply means) 24, and a coolant supply system 26 are connected to the fuel cell 14. The fuel gas supply system 22 has a hydrogen supply passage 30 connected to a hydrogen tank 28 and a fuel gas inlet port 22a of the fuel cell 14. The hydrogen supply passage 30 is connected to a shutoff valve 32, an ejector 34, and a hydrogen supply pump 35 that are successively arranged in the order named from the hydrogen tank 28.

The fuel cell 14 has a fuel gas outlet port 22b connected to a hydrogen circulation passage 36 which is connected to the hydrogen supply passage 30 through the ejector 34. A purge valve 40 is connected to a hydrogen discharge passage 38 that is branched from the hydrogen circulation passage 36.

The reactive gas supply system 24 has an air supply passage 44 connected to an air compressor (or a supercharger) 42 and a reactive gas inlet port 24a of the fuel cell 14. The fuel cell 14 has a reactive gas outlet port 24b connected to an air discharge passage 46 which is connected to an exhaust pipe 50 through a back pressure valve 49.

The coolant supply system 26 has a coolant circulation passage 52 connected to a coolant inlet port 26a and a coolant outlet port 26b of the fuel cell 14. The coolant circulation passage 52 is connected to a coolant circulation pump 54 for circulating a coolant. The coolant circulation passage 52 has a heat radiator 53 for radiating head from the coolant to cool the coolant as the coolant is circulated through the heat radiator 53 by the coolant circulation pump 54.

In the fuel cell 14, a hydrogen gas (fuel gas) supplied from the hydrogen supply passage 30 by the hydrogen supply pump 35 and air (reactive gas) compressed to a predetermined pressure by the air compressor 42 and supplied from the air supply passage 44 are sent to respective electrodes, and consumed by an electrochemical reaction in electrode catalyst layers to generate electric power. The generated electric power is output from a positive output terminal 14p and a negative output terminal 14n. In the electric system 10, positive and negative components provided in pairs are denoted by reference numerals with a suffix "p" and a suffix "n", respectively.

An exhaust gas including an unused hydrogen gas in the fuel cell 14 is discharged from the fuel gas outlet port 22b into the hydrogen circulation passage 36. The exhaust gas flows through the hydrogen circulation passage 36 and is supplied from the ejector 34 into the hydrogen supply passage 30, and is supplied again as the fuel gas to the fuel cell 14. The air that is consumed in the fuel cell 14 is discharged from the reactive gas outlet port 24b into the air discharge passage 46.

The fuel cell system for operating the fuel cell 14 is not limited to the above structure. The fuel cell system may be a system free of the hydrogen supply pump 35 or a system wherein the hydrogen supply pump 35, the air compressor 42, and the coolant circulation pump 54 may be operated by a single electric motor.

Electric motors 35a, 42a, 54a, which serve as a fuel cell accessory, operate the hydrogen supply pump 35, the air compressor 42, and the coolant circulation pump 54, respectively. The electric motors 35a, 42a, 54a are electrically connected to a first power supply line 72 (see FIG. 1) by electric connections that are omitted from illustration in FIG. 2.

As shown in FIG. 1, the electric system 10 has an electric storage device 70 for storing electric power under a voltage lower than the output voltage of the fuel cell 14, a first power supply line 72 connected to the output terminals 14p, 14n of the fuel cell 14, a second power supply line 73 connected to output terminals 70p, 70n of the electric storage device 70, and a first DC-to-DC converter 74 for converting voltages bidirectionally between the first power supply line 72 and the second power supply line 73. The first power supply line 72 includes a positive line 72p and a negative line 72n, and the second power supply line 73 includes a positive line 73p and a negative line 73n. For the electric storage device 70, various types of secondary batteries, a lead battery, a lithium ion battery, an electric double-layer capacitor, or the like, may be used.

The electric system 10 has a first electric accessory 76 for being supplied with electric power from the first power supply line 72 and a second electric accessory 78 for being supplied with electric power from the second power supply line 73. The first electric accessory 76 is a fuel cell accessory for operating the fuel cell 14. The second electric accessory 78 is an electric accessory other than the fuel cell accessory, and is mounted on general motor vehicles other than the fuel cell vehicle 12.

Components of the electric system 10 which are shown in FIG. 1 as being positioned below the first DC-to-DC converter 74, i.e., the electric storage device 70, a power supply switch unit 98, the second power supply line 73, and the second electric accessory 78, jointly make up an auxiliary electric system 100 as a single unit. The auxiliary electric system 100 is connected to the DC-to-DC converter 74 through terminals 101. However, the auxiliary electric system 100 is not limited to being assembled as a single unit, but may be a conceptual system in the form of a circuit that is connected through the first DC-to-DC converter 74 to the first power supply line 72 and operable under a voltage V2 (or a voltage V4) lower than the output voltage V1 of the fuel cell 14, the circuit including the electric storage device 70, the second power supply line 73, and the second electric accessory 78.

The inverter 16 and the propulsive motor 17 is included in the electric system 10, and are supplied with electric power from the first power supply line 72. Of the electric devices mounted on the fuel cell vehicle 12, the propulsive motor 17 is particularly a high load and serves as a major component on the self-propelled vehicle. The propulsive motor 17 may be referred to as a principal component against the first electric accessory 76 and the second electric accessory 78. The inverter 16 converts DC electric power supplied from the first power supply line 72 into three-phase AC electric power, and supplies the three-phase AC electric power to the propulsive motor 17 at a frequency and a power level which are commensurate with the vehicle driver's action on the accelerator pedal of the fuel cell vehicle 12.

The first power supply line 72 has a voltage sensor 72a for measuring the voltage V1 and a current sensor 72c for measuring an output current from the fuel cell 14. The positive line 72p and the negative line 72n have respective main contactors 77p, 77n, and the negative line 72n has a reverse-current blocking diode 72b.

Figure 3:
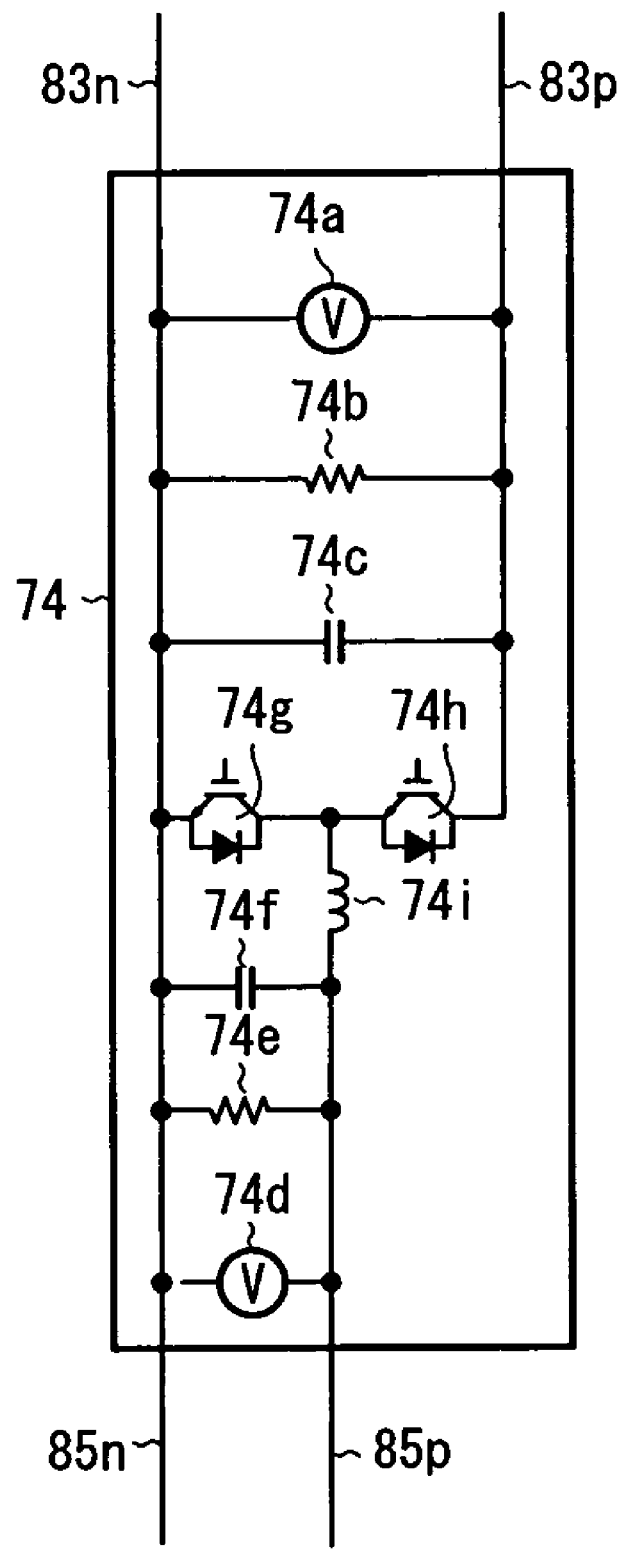
FIG. 3 is a circuit diagram of a first DC-to-DC converter.

As shown in FIG. 3, the first DC-to-DC converter 74 has a voltage sensor 74a, a protective resistor 74b, and a stabilizing capacitor 74c which are connected to a higher-voltage side, i.e., the first power supply line 72, and a voltage sensor 74d, a protective resistor 74e, and a stabilizing capacitor 74f which are connected to a lower-voltage side, i.e., the second power supply line 74. The first DC-to-DC converter 74 also has a voltage-increasing switching device 74g and a voltage-decreasing switching device 74h.

The first DC-to-DC converter 74 has a pair of lines 83p, 83n connected to the higher-voltage side, and a pair of lines 85p, 85n connected to the lower-voltage side. The negative lines 83n, 85n are connected to each other. The switching device 74g and the switching device 74h are connected in series to each other, the voltage-increasing switching device 74g being connected to the line 83n and the voltage-decreasing switching device 74h to the line 83p. The low-voltage line 85p is connected to a branched point between the voltage-increasing switching device 74g and the voltage-decreasing switching device 74h through a reactor 74i for stabilizing an electric current. The high-voltage lines 83p, 83n are connected respectively to the positive line 72p and the negative line 72n of the first power supply line 72. The low-voltage lines 85p, 85n are connected respectively to the positive line 73p and the negative line 73n of the second power supply line 73.

The switching devices 74g, 74h operate as choppers that are repeatedly turned on and off at a high frequency for thereby reducing the voltage V1 of electric power supplied from the first power supply line 72 to the voltage V2. Therefore, the first DC-to-DC converter 74 supplies electric power of the voltage V2 to the second power supply line 73. The electric power thus supplied from the first power supply line 72 through the first DC-to-DC converter 74 to the second power supply line 73 is applied to charge the electric storage device 70 or supplied to the second electric accessory 78. Each of the switching devices 74g, 74h and switching devices 79d, 90d, which are to be described later, is a semiconductor device such as a transistor, a thyristor, an FET (Field Effect Transistor), an IGBT (Insulated Gate Bipolar Transistor), or the like.

When the propulsive motor 17 is put under a high load, the first DC-to-DC converter 74 increases the voltage V2 of electric power from the second power supply line 73 to the voltage V1, and supplies electric power of the voltage V1 to the first power supply line 72. At this time, the electric power on the second power supply line 73 is supplied from the electric storage device 70 as it is discharged.

As described above, the first electric accessory 76 is a fuel cell accessory for operating the fuel cell 14. The first electric accessory 76 includes the electric motor 42a for operating the air compressor 42, the electric motor 35a for operating the hydrogen supply pump 35, and the electric motor 54a for operating the coolant circulation pump 54. Of these electric motors, the electric motor 42a for operating the air compressor 42 is supplied with electric power from the first power supply line 72 through a second DC-to-DC converter 79. The first electric accessory 76 may be a fuel reformer.

Figure 4:
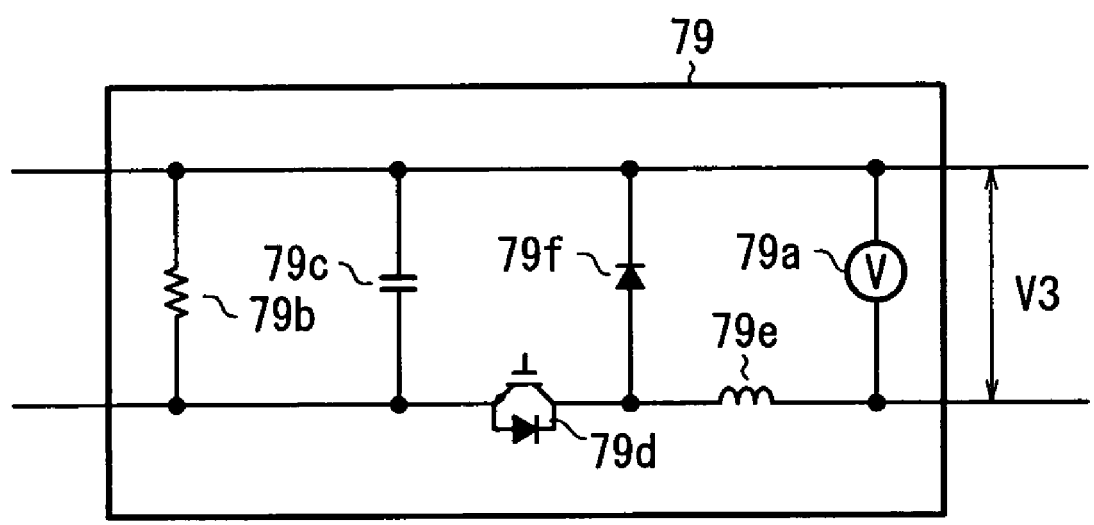
FIG. 4 is a circuit diagram of a second DC-to-DC converter.

As shown in FIG. 4, the second DC-to-DC converter 79 has a function to lower the voltage V1 of electric power on the first power supply line 72 to a voltage V3. The second DC-to-DC converter 79 includes a voltage sensor 79a, a protective resistor 79b, a stabilizing capacitor 79c, a switching device 79d, a reactor 79e for stabilizing an electric current, and a surge-cutoff diode 79f. The electric motor 42a is an AC three-phase electric motor whose rotation is controlled by an inverter 81.

Figure 5:
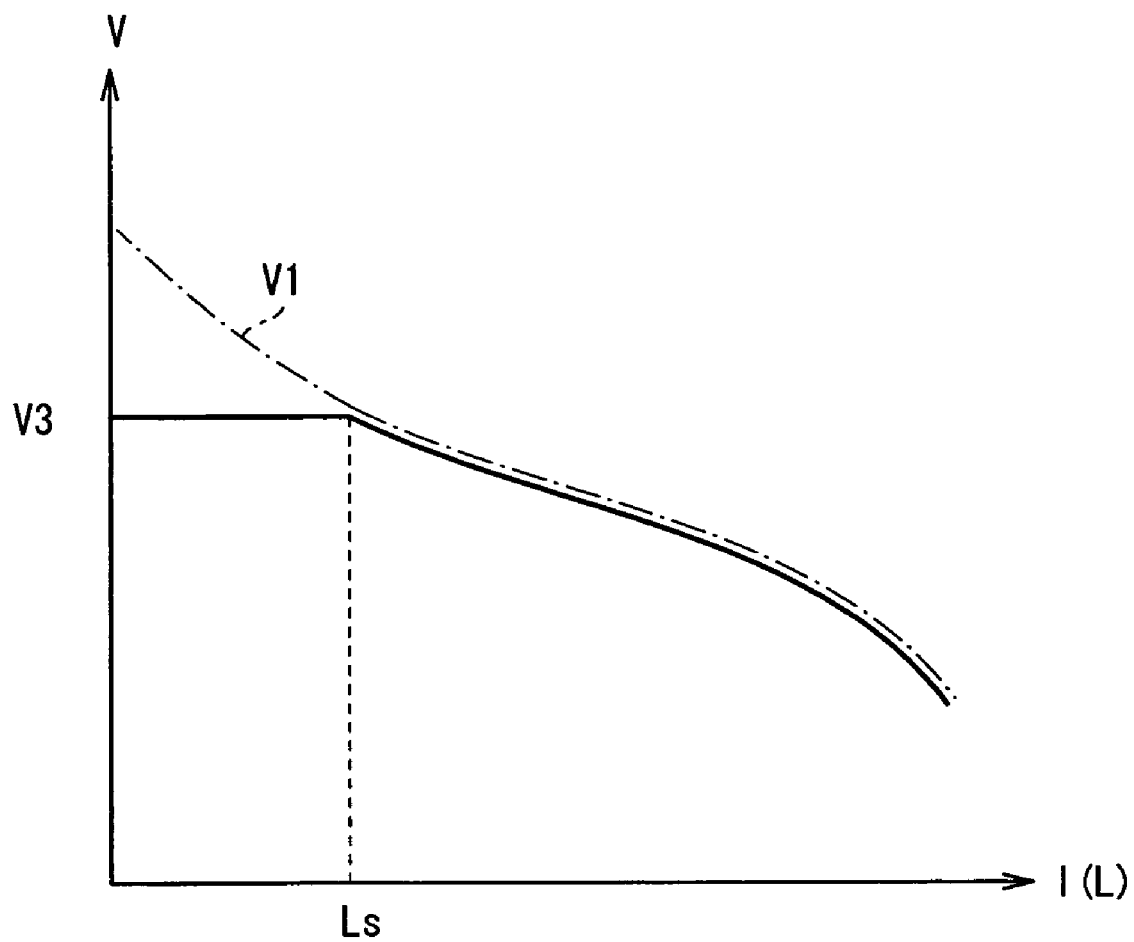
FIG. 5 is a graph of voltage control characteristics of the second DC-to-DC converter.

FIG. 5 is an IV characteristic diagram having a horizontal axis representing electric currents and a vertical axis representing voltages. FIG. 5 shows voltage characteristics of the fuel cell 14 in comparison with the voltage V3 that is controlled by the switching device 79d. When a load current I (or a load L) of the propulsive motor 17 is smaller than a prescribed threshold valve Ls, the switching device 79d operates as a chopper to lower the voltage V1 applied thereto to the voltage V3. When the load L is equal or greater than the prescribed threshold valve Ls, the switching device 79d is continuously turned on to directly connect input and output terminals thereof, supplying electric power to the inverter 81 and the air compressor 42. When the input and output terminals of the switching device 79d are directly connected to each other, it generates less heat, allowing the second DC-to-DC converter 79 to be small in size.

As described above, the second electric accessory 78 is an electric accessory other than the fuel cell accessory, and represents ordinary vehicle accessories including an electrically operated air conditioner motor 80, windshield wiper motors 82, power window motors 84, etc.

The electrically operated air conditioner motor 80 is a three-phase electric motor whose rotation is controlled by an inverter 86. Since the fuel cell vehicle 12 has no internal combustion engine mounted thereon, it is free of a rotational drive source that rotates at all times. Therefore, the fuel cell vehicle 12 has an electrically operated air conditioner, with a compressor 88 being operated by the electrically operated air conditioner motor 80. As no internal combustion engine is mounted on the fuel cell vehicle 12, the fuel cell vehicle 12 does not have a heat source for generating a large amount of heat. The electrically operated air conditioner is also used to heat the space in the passenger cabin of the fuel cell vehicle 12, and operates as a so-called heat pump. The electrically operated air conditioner motor 80 compresses and circulates a refrigerant by operating the compressor 88 thereby to adjust the temperature in the passenger cabin. The electrically operated air conditioner motor 80 is of a relatively large capacity as it needs to compress the refrigerant.

The windshield wiper motors 82, power window motors 84, etc., other than the electrically operated air conditioner motor 80, of the second electric accessory 78 are connected to the second power supply line 73 through a third DC-to-DC converter 90 which reduces the voltage V2 to a lower voltage V4 (e.g., 12 V). The third DC-to-DC converter 90 has output lines to which a lead battery 92 is connected.

The third DC-to-DC converter 90 operates to lower a voltage in the same manner as the second DC-to-DC converter 79. Specifically, the third DC-to-DC converter 90 has switching devices that operate as choppers to lower the applied voltage V2 to the voltage V4 and output the voltage V4.

Figure 6:
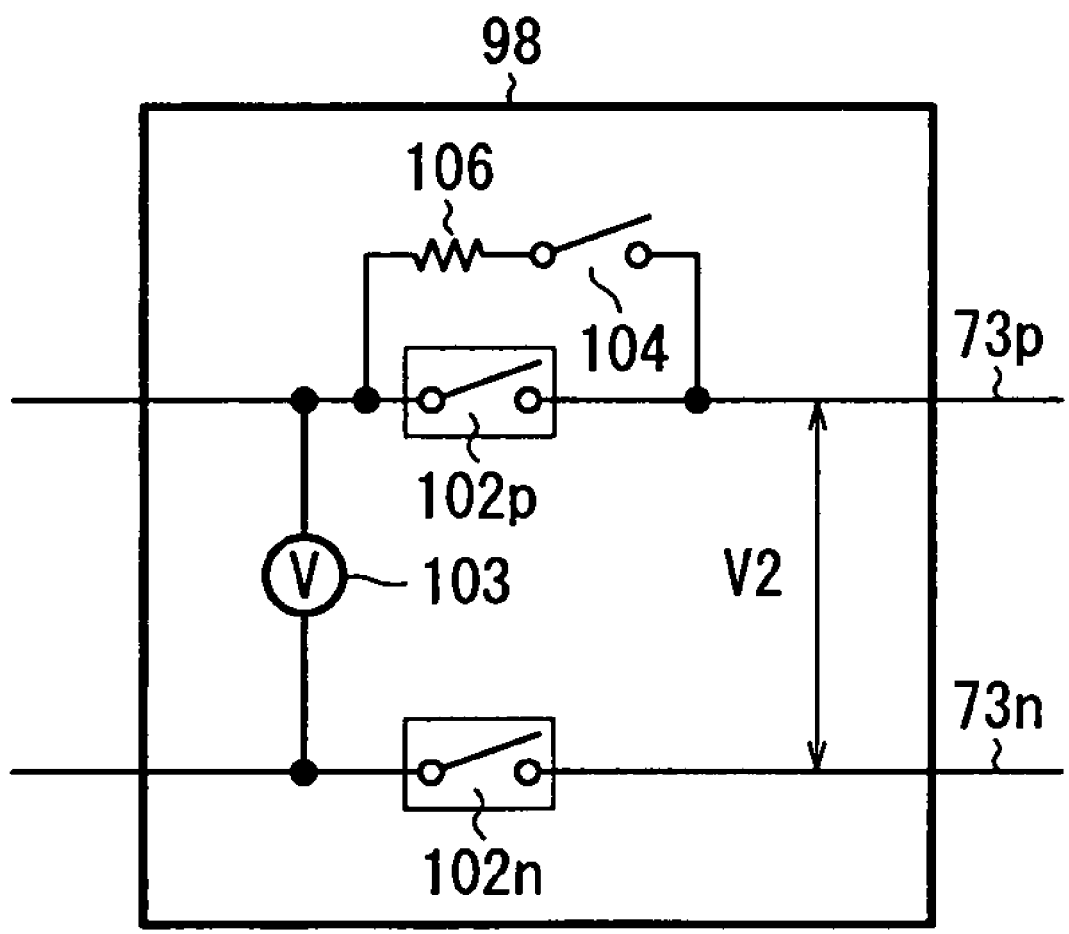
FIG. 6 is a circuit diagram of a power supply switch unit.

The electric storage device 70 is connected to the second power supply line 73 through the power supply switch unit 98 which serves to control connections. As shown in FIG. 6, the power supply switch unit 98 has a voltage sensor 103 for detecting the voltage V2, a pair of battery contactors 102$p$, 102$n$ connected respectively to the positive line 73$p$ and the negative line 73$n$, and a series-connected circuit of a precontactor 104 and a limiting resistor 106 which are connected in parallel to the battery contactor 102$p$.

The main contactors 77$p$, 77$n$, the first DC-to-DC converter 74, the second DC-to-DC converter 79, and the power supply switch unit 98 are connected to a power supply controller 110, and perform a predetermined power supply controlling process under the control of the power supply controller 110. The third DC-to-DC converter 90 is not connected to the power supply controller 110, and converts voltages by itself.

Electric motors 35$a$, 42$a$, 54$a$, which serve as the fuel cell accessory, are basically supplied with electric power from the first power supply line 72. Other fuel cell accessories, such as a controller, valves, a radiator fan, etc. (not shown), which consume a small amount of electric power may be supplied with electric power from the second power supply line 73.

Figure 7:
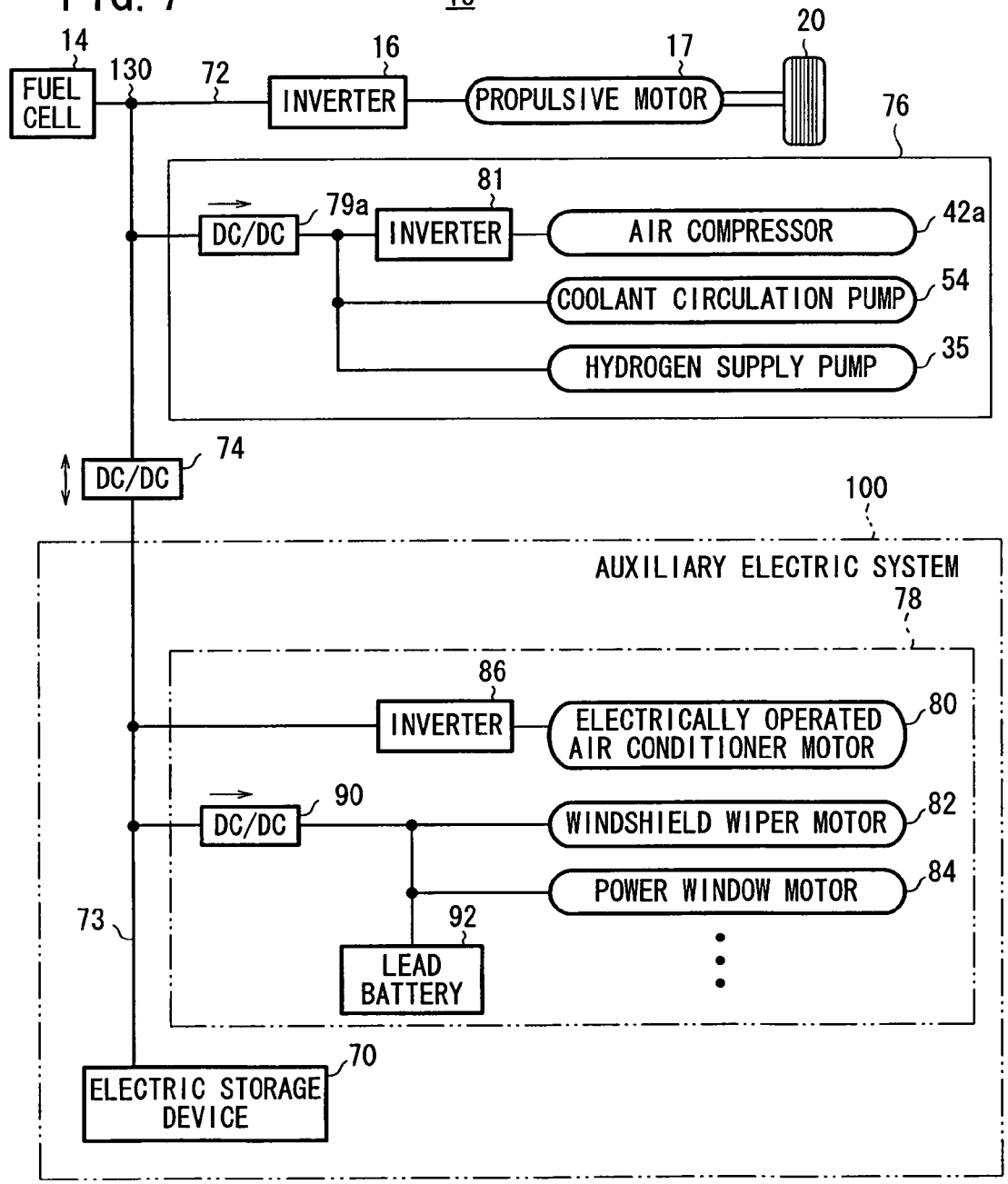
FIG. 7 is a simplified block diagram of the electric system.

The electric system 10 thus constructed is illustrated in simplified block form in FIG. 7. As shown in FIG. 7, the fuel cell 14 and the electric storage device 70 are connected in parallel to each other with respect to the propulsive motor 17 and connected to the propulsive motor 17 through the inverter 16, and the first DC-to-DC converter 74 is connected closer to the electric storage device 70 than the junction 130 where the fuel cell 14 and the electric storage device 70 are connected in parallel to each other. The inverter 81 and the electric motor 42$a$ are connected so as to be supplied with electric power from the first power supply line 72 which includes the junction 130.

Figure 8:
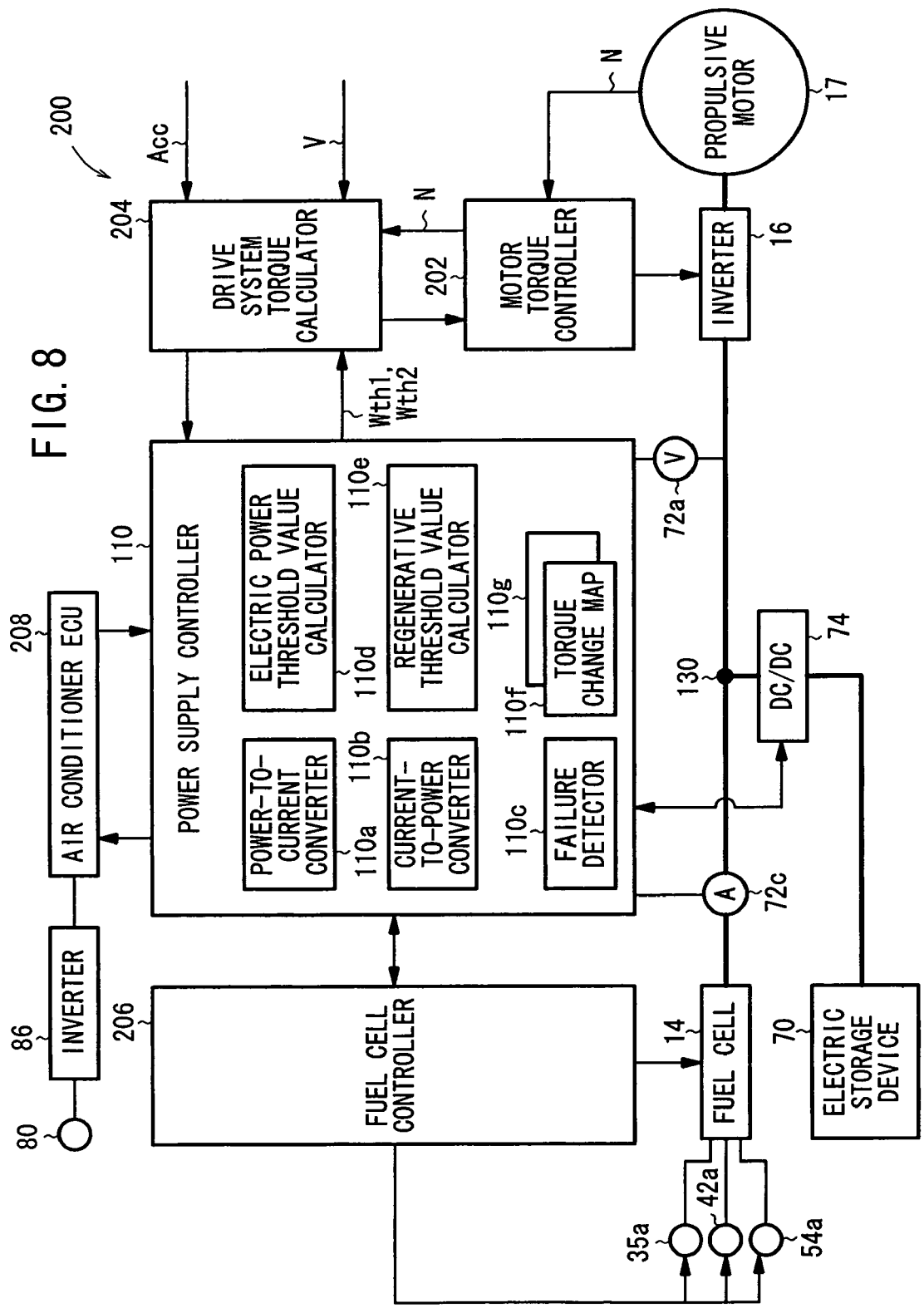
FIG. 8 is a block diagram of an electric power control system.

An electric power control system 200 in the electric system 10 will be described below with reference to FIG. 8. The electric power control system 200 has the power supply controller 110, a motor torque controller 202 for controlling the inverter 16 and the propulsive motor 17, a drive system torque calculator (regenerative electric power limiting means) 204 for calculating a torque to be generated by the propulsive motor 17 based on an accelerator opening Acc, a vehicle speed V, and a rotational speed N of the propulsive motor 17, a fuel cell controller (response limiting means, protection control means) 206 for controlling the fuel cell 14, and an air conditioner ECU (vehicle accessory electric power control means) 208 for controlling the air conditioner. The power supply controller 110, etc. have a CPU (Central Processing Unit) as a main control unit, a RAM (Random Access Memory) and a ROM (Read Only Memory) as a storage unit, and a drive. The CPU reads a program and executes the program in cooperation with the storage unit, etc. to perform the power supply controlling process. The power supply controller 110, etc. are supplied with electric power from the lead battery 92, for example, and hence can operate even in the event of a shutdown of the fuel cell 14.

The power supply controller 110 has a power-to-current converter 110$a$ for converting a measured electric power value into an electric current value, a current-to-power converter 110$b$ for converting a measured electric current value into an electric power value, a failure detector 110$c$ for detecting a failure of the first DC-to-DC converter 74 (hereinafter referred to as "converter failure"), an electric power threshold value calculator 110$d$ for determining an allowable motor output electric power upper limit value Wth1 which is an upper limit value for the output power generated by the propulsive motor 17, and a regenerative threshold value calculator 110$e$ for determining an allowable motor regenerative electric power upper limit value Wth2 which is an upper limit value for the regenerative electric power generated by the propulsive motor 17. A converter failure is judged by detecting electric currents at the input and output sides of the first DC-to-DC converter 74 and determining whether a proper electric current flows through the first DC-to-DC converter 74 or not. If the first DC-to-DC converter 74 has a function to output a failure signal in the event of a converter failure, then a converter failure may be judged based on the failure signal. If the failure detector 110$c$ detects a converter failure, the power supply controller 110 sends a failure signal to the motor torque controller 202, the drive system torque calculator 204, the fuel cell controller 206, and the air conditioner ECU 208. Information indicative of whether there is a converter failure or not may be displayed on the instrument panel in front of the driver seat or the like for the driver to recognize the information. The fuel cell vehicle 12 according to the present invention is capable of traveling a considerable distance even in the event of a converter failure. Consequently, when the driver recognizes the converter failure from the display on the instrumental panel, it is highly possible for the fuel cell vehicle 12 to be able to continue traveling to a nearby service shop or a fuel refilling station where the fuel cell vehicle 12 can be repaired or refilled with fuel.

The power supply controller 110 limits the response of the electric power output from the fuel cell 14 by setting an allowable output change in the output electric power from the propulsive motor 17 in the event of a converter failure, to a value smaller than when the first DC-to-DC converter 74 is normal. The loads on the fuel cell 14 include the propulsive motor 17, the hydrogen supply pump 35, the air compressor 42, and the coolant circulation pump 54. Of these loads, the propulsive motor 17 is the largest. Therefore, the response of the electric power output from the fuel cell 14 can effectively be limited by limiting the torque of the propulsive motor 17.

Figure 9:
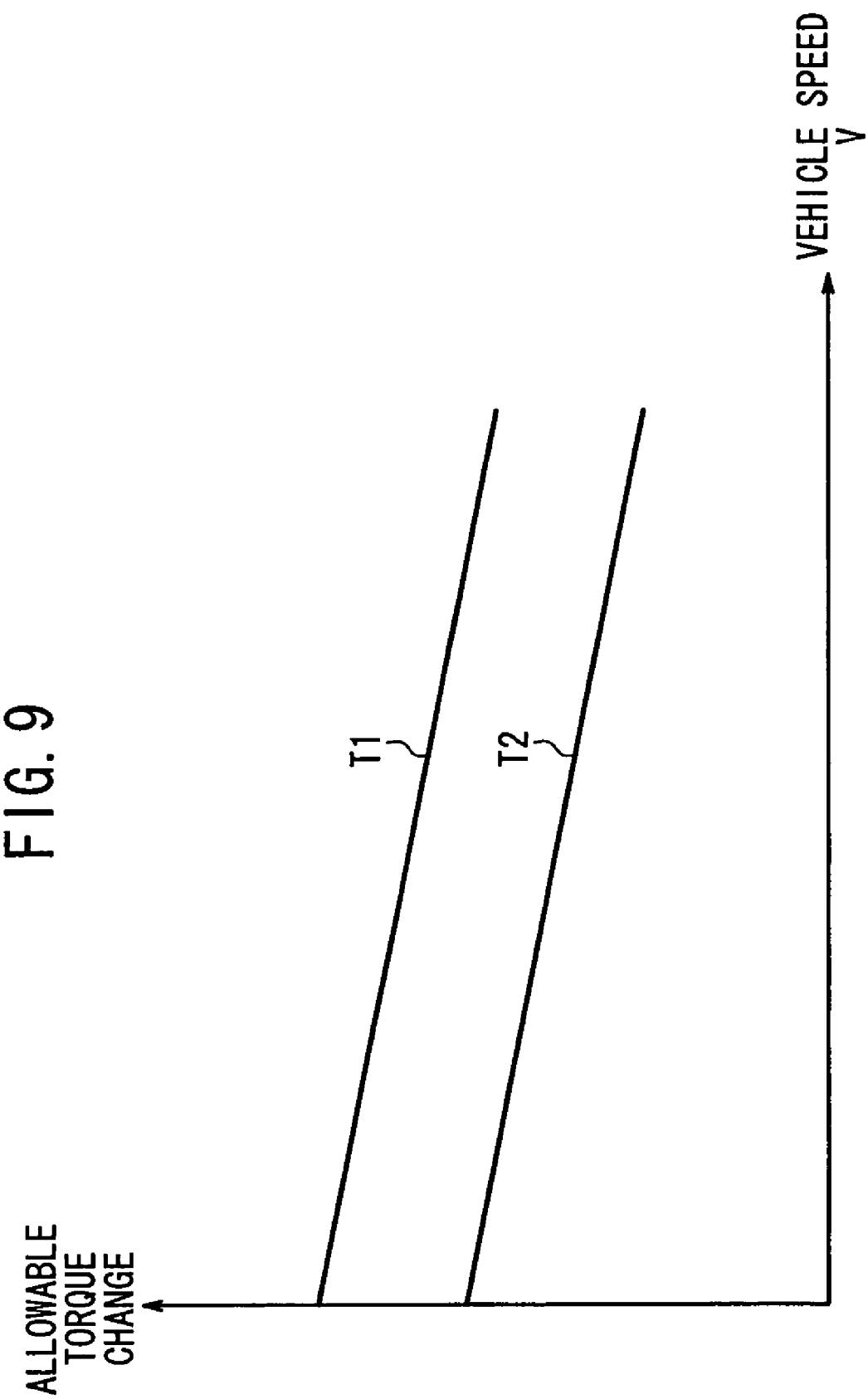
FIG. 9 is a graph showing the relationship between vehicle speeds and allowable torque changes.

Specifically, allowable torque changes T1 when the first DC-to-DC converter 74 is normal and allowable torque changes T2 when the first DC-to-DC converter 74 suffers a failure are recorded respectively in a torque change map 110$f$ and a torque change map 110$g$. An allowable torque change is searched for by selecting one of the torque change map 110$f$ and the torque change map 110$g$ to be referred to, based on whether there is a converter failure or not. Specifically, as shown in FIG. 9, an allowable torque change T1 when the first DC-to-DC converter 74 is normal is set so as to decrease as the vehicle speed V increases because the output changes largely with a small torque change when the vehicle speed V is high. An allowable torque change T2 in the event of a converter failure is set to a value to which the allowable torque change T1 has been reduced a predetermined level. These allowable torque changes T1, T2 act as threshold values for limiting a motor torque command depending on the vehicle speed V.

By thus setting allowable output changes as the allowable torque changes T1, T2 for the propulsive motor 17, the propulsive motor 17 has its mechanical characteristics directly controlled, making it easier to adjust drivability of the fuel cell vehicle 12 as it travels than if changes in the output electric power are limited. The controlling process is simple because the allowable torque changes T1, T2 can be searched for by selecting one of the torque change map 110f and the torque change map 110g based on whether there is a converter failure or not. The allowable torque changes T1, T2 may be determined according to a predetermined formula.

When the motor torque controller 202 receives a failure signal, the motor torque controller 202 performs switching control on the inverter 16 to control the regenerative electric power of the propulsive motor 17 so as to be equal to or less than a prescribed regenerative electric power limit value. When the air conditioner ECU 208 receives a failure signal, the air conditioner ECU 208 controls the inverter 81 to limit the electric power consumed by the electrically operated air conditioner motor 80.

In the electric power control system 200, the drive system torque calculator 204 indicates a torque calculated from the accelerator opening Acc, etc. to the motor torque controller 202, which performs switching control on the inverter 16 to control the torque generated by the propulsive motor 17. The drive system torque calculator 204 also calculates required electric power Wr which is required for the propulsive motor 17 to generate the calculated torque, and indicates the required electric power Wr to the power supply controller 110. In the power supply controller 110, the power-to-current converter 110a converts the required electric power Wr into an electric current value, and indicates the electric current value to the fuel cell controller 206. The fuel cell controller 206 controls the fuel cell 14 and the electric motors 35a, 42a, 54a to generate the indicated electric current value.

The fuel cell controller 206 also indicates an amount Wc of electric power that can be generated by the fuel cell 14 at the present time and also an amount W of electric power that is being actually generated by the fuel cell 14, based on the temperature of the fuel cell 14, etc., to the power supply controller 110.

Figure 10:
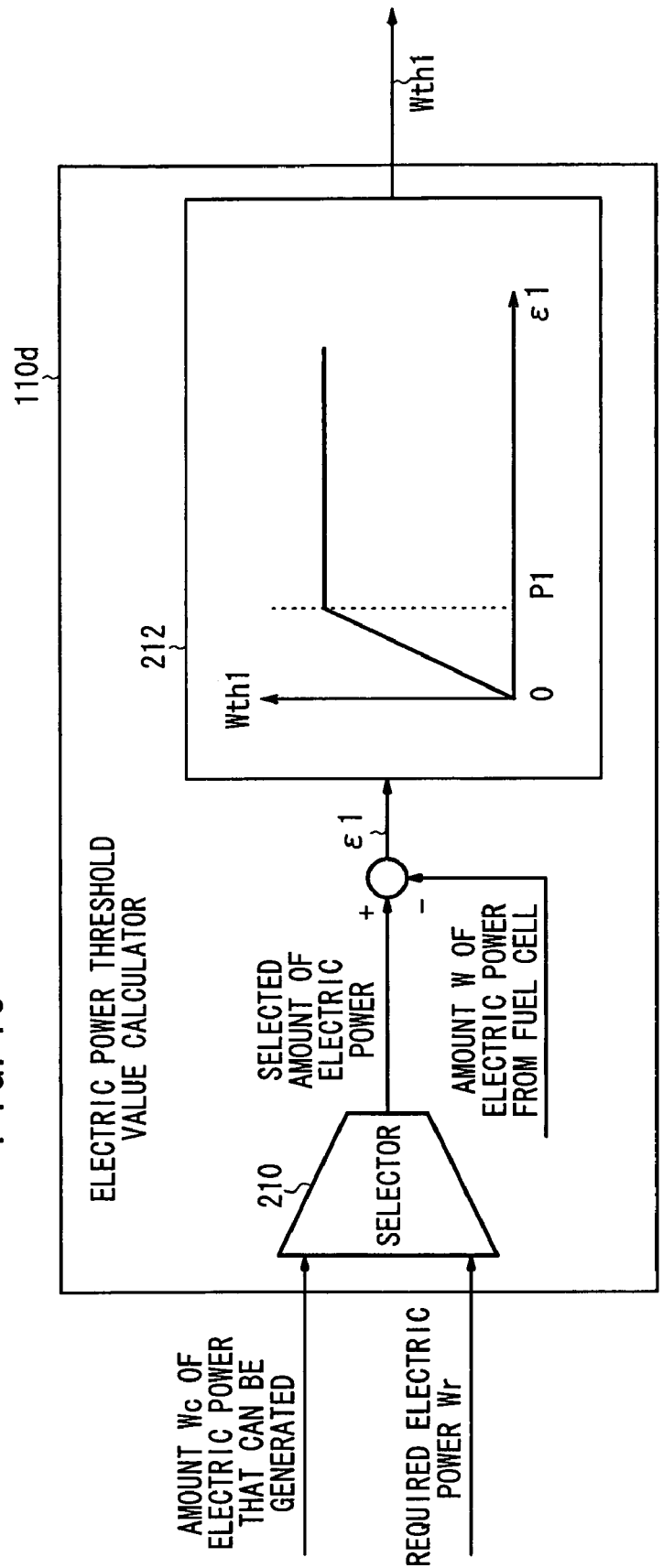
FIG. 10 is a block diagram of an electric power threshold calculator.

As shown in FIG. 10, a selector 210 in the electric power threshold value calculator 110d selects a smaller one of the amount Wc of electric power that can be generated and the required electric power Wr, and determines a difference $\epsilon 1$ that is produced by subtracting the amount W of electric power generated by the fuel cell 14 from the selected amount of electric power. Based on the determined difference $\epsilon 1$, the electric power threshold value calculator 110d refers to a first threshold value table 212 to determine an allowable motor output electric power upper limit value Wth1. The first threshold value table 212 is established such that the allowable motor output electric power upper limit value Wth1 is of a sufficiently large constant value when the difference $\epsilon 1$ is greater than a predetermined value P1, is proportionally reduced when the difference $\epsilon 1$ is reduced from the predetermined value P1 toward 0, and is 0 when the difference $\epsilon 1$ is 0. Accordingly, as the amount W of electric power generated by the fuel cell 14 progressively increases toward a smaller one of the amount Wc of electric power that can be generated and the required electric power Wr, the allowable motor output electric power upper limit value Wth1 is set to a smaller value.

Figure 11:
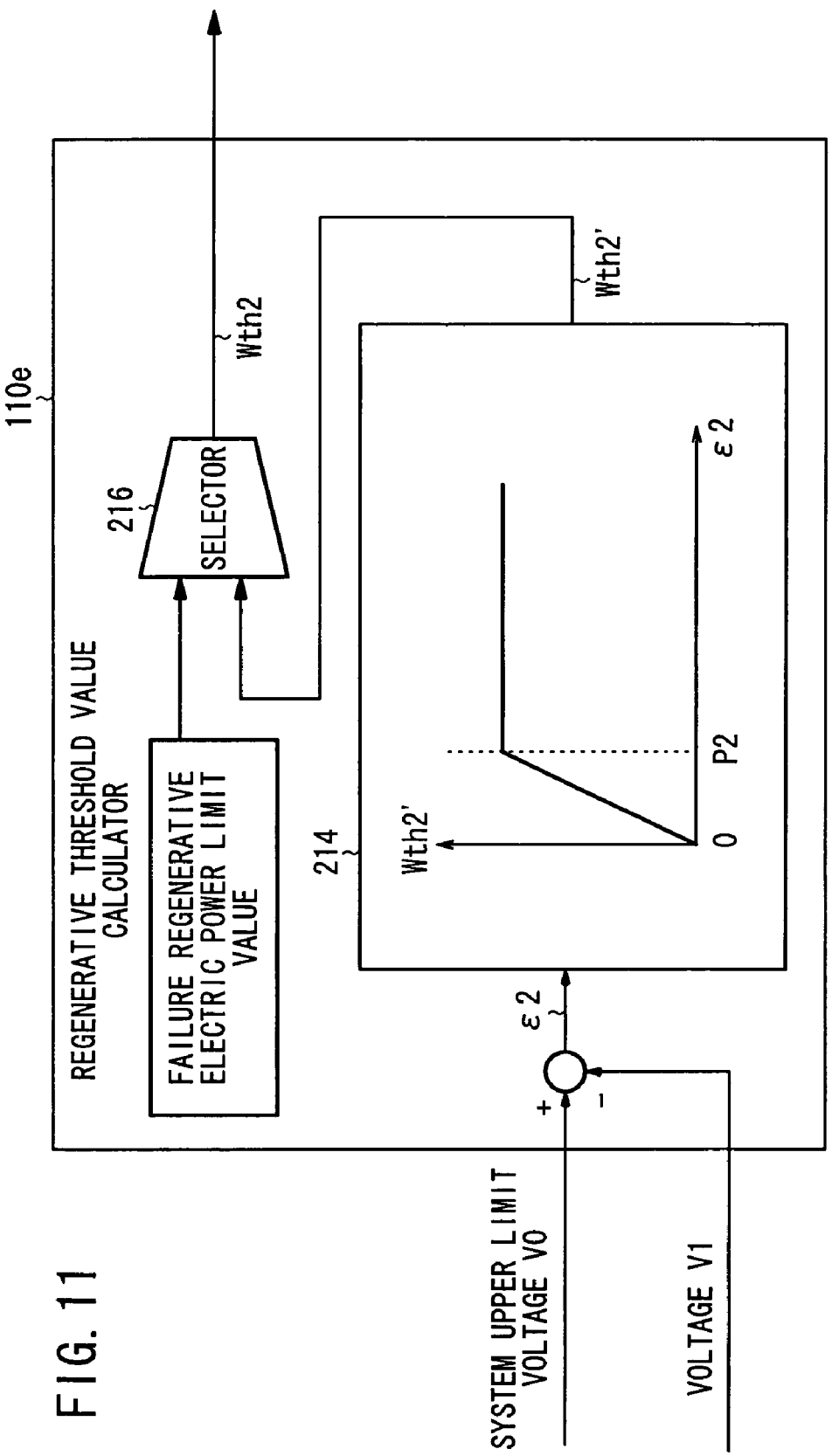
FIG. 11 is a block diagram of a regenerative threshold calculator.

As shown in FIG. 11, the regenerative threshold value calculator 110e determines a difference $\epsilon 2$ by subtracting the output voltage V1 of the fuel cell 14 from a predetermined system upper limit value V0, for thereby performing a feedback-like process to limit the amount W of electric power generated by the fuel cell 14 to a value smaller than the amount Wc of electric power that can be generated at all times even when the response of the fuel cell 14 changes depending on the temperature. Based on the determined difference $\epsilon 2$, the regenerative threshold value calculator 110e refers to a second threshold value table 214 to determine a provisional threshold value Wth2' for the allowable motor regenerative electric power upper limit value Wth2. The second threshold value table 214 is similar to the first threshold value table 212, and is specifically established such that the provisional threshold value Wth2' is of a sufficiently large constant value when the difference $\epsilon 2$ is greater than a predetermined value P2, is proportionally reduced when the difference $\epsilon 2$ is reduced from the predetermined value P2 toward 0, and is 0 when the difference $\epsilon 2$ is 0. A selector 216 in the regenerative threshold value calculator 110e compares the determined provisional threshold value Wth2' with a predetermined failure regenerative electric power limit value, selects a smaller one, and sets the selected value as an allowable motor regenerative electric power upper limit value Wth2. The failure regenerative electric power limit value is established as a value which limits in advance the maximum regenerative amount of the propulsive motor 17 thereby to prevent the voltage V1 from increasing abruptly, and is selected from different values depending on whether there is a converter failure or not.

By thus setting the allowable motor regenerative electric power upper limit value Wth2, even if the regenerative electric power is not absorbed by the electric storage device 70, but by the electric motors 35a, 42a, 54a only in the event of a failure of the first DC-to-DC converter 74, the voltage V1 is appropriately limited so as not to exceed the system upper limit value V0 and hence is prevented from becoming an overvoltage.

The allowable motor output electric power upper limit value Wth1 and allowable motor regenerative electric power upper limit value Wth2 which have been determined are supplied to drive system torque calculator 204. The drive system torque calculator 204 controls the inverter 16 to limit the regenerative electric power of the propulsive motor 17 to a value equal to or smaller than a smaller one of the allowable motor output electric power upper limit value Wth1 and allowable motor regenerative electric power upper limit value Wth2. In this manner, the electric system 10 is reliably protected against trouble due to the temperature, etc.

Figure 12:
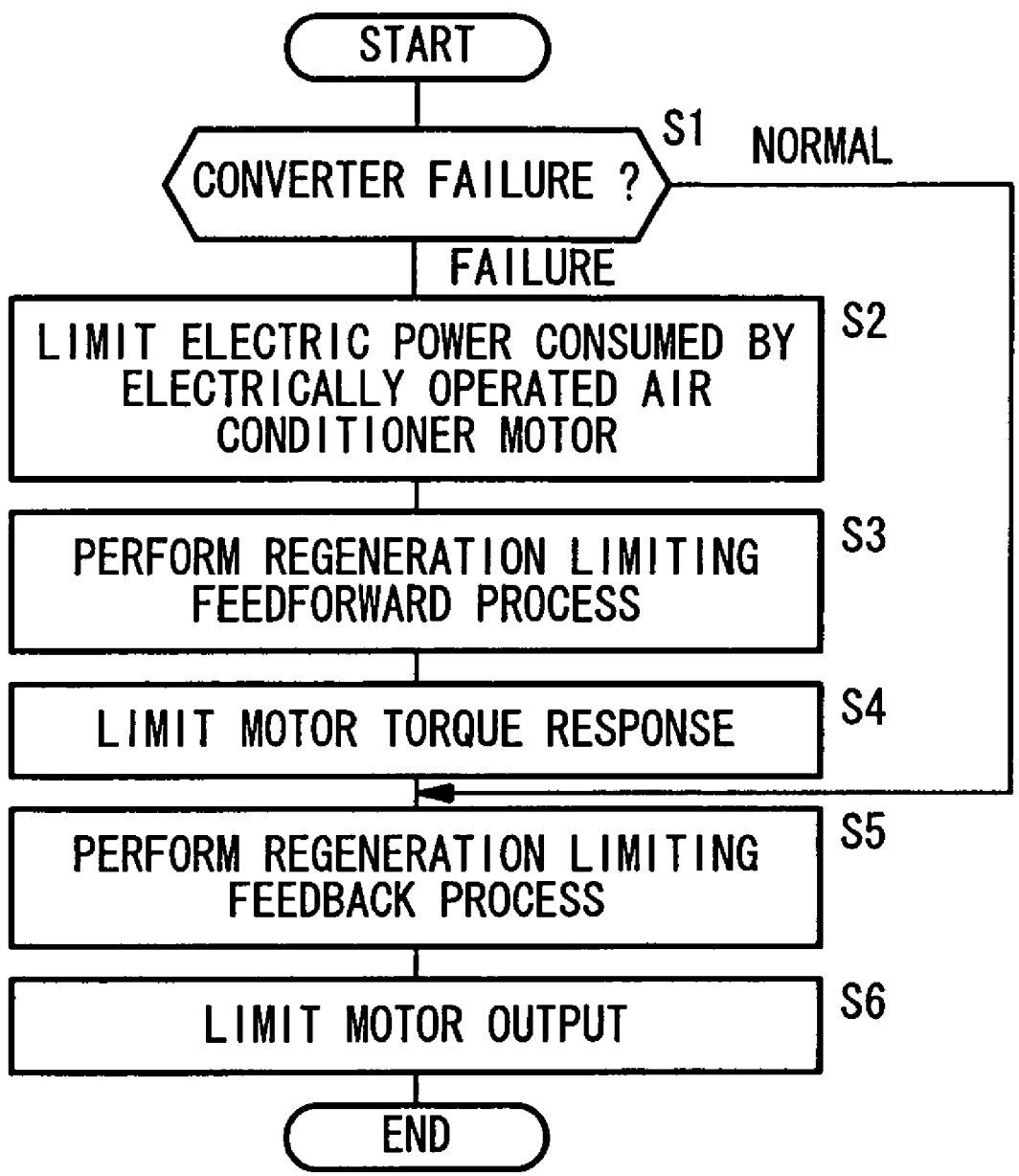
FIG. 12 is a flowchart of a control sequence of the electric power control system.
Figure 13:
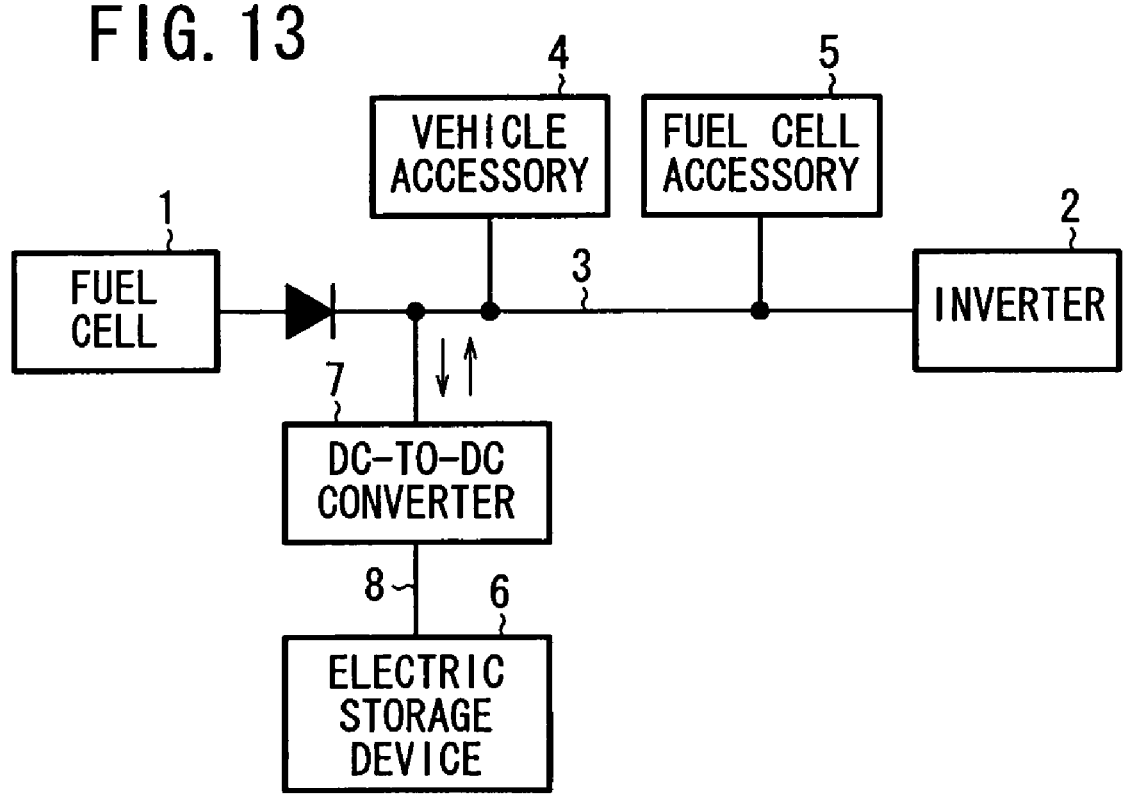
FIG. 13 is a block diagram of a conventional electric system.
Figure 14:
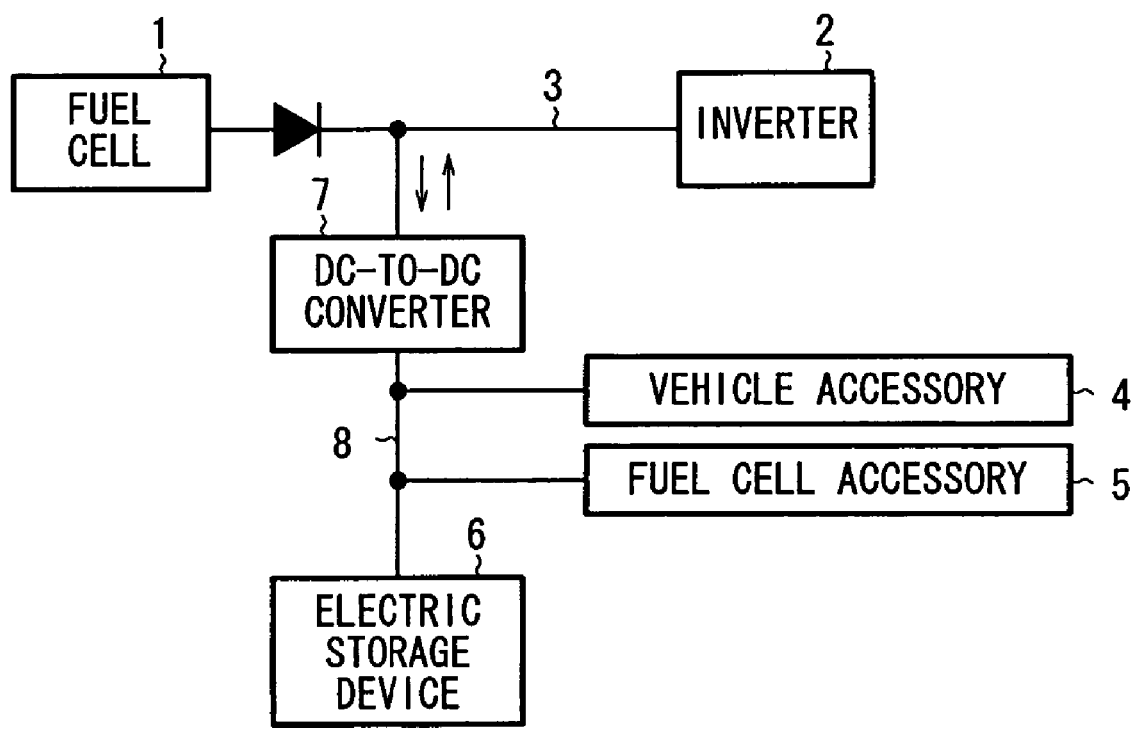
FIG. 14 is a block diagram of another conventional electric system.

Operation of the electric power control system 200 on the fuel cell vehicle 12 will be described below with reference to a control sequence shown in FIG. 12. The control sequence shown in FIG. 12 is software-implemented mainly by the power supply controller 110 and the fuel cell controller 206, and is repeatedly executed in given small time cycles.

In step S1, the failure detector 110c determines whether there is a converter failure or not. If a converter failure is detected, then control goes to step S2. If no converter failure is detected, then control jumps to step S5.

In step S2, a failure signal is sent to the air conditioner ECU 208 to limit the electric power consumed by the electrically operated air conditioner motor 80 or turns off the electrically operated air conditioner motor 80. Since the electrically operated air conditioner motor 80 consumes a large amount of electric power among the vehicle accessories and is not a device that is indispensable for moving the fuel cell vehicle 12, when the electric power consumed by the electrically operated air conditioner motor 80 is limited, the distance that the fuel cell vehicle 12 can travel in the event of a converter failure is increased.

According to the present embodiment, the electrically operated air conditioner motor 80 is connected to the second power supply line 73 (see FIG. 7). In the event of a converter failure, the electrically operated air conditioner motor 80 is supplied with electric power from the electric storage device 70 only. Therefore, even when the electric power consumed by the electrically operated air conditioner motor 80 is limited, the amount of electric power generated by the fuel cell 14 is not directly limited. However, of the fuel cell accessories for operating the fuel cell 14, those fuel cell accessories, such as a controller 206, valves, a radiator fan, etc. (not shown), which consume a small amount of electric power, are generally connected to the low-voltage second power supply line 73. When the electric power consumed by the electrically operated air conditioner motor 80 is limited, the electric power discharged from the electric storage device 70 is limited, increasing the operating times of these fuel cell accessories which consume a small amount of electric power. As a result, the operating time of the fuel cell 14 is increased, allowing the fuel cell vehicle 12 to travel a longer distance. If the electrically operated air conditioner motor 80 is connected to the first power supply line 72, then when the electric power consumed by the electrically operated air conditioner motor 80 is limited, the electric load on the fuel cell 14 is reduced to avoid a gas shortage, and the amount of the fuel gas that is consumed is reduced to allow the fuel cell vehicle 12 to travel a longer distance.

In step S3, a regeneration limiting feedforward process is performed. Specifically, the failure regenerative electric power limit value (see FIG. 11) is selectively set to a value in the event of a converter failure.

In step S4, a motor torque response limiting process is performed. Specifically, as shown in FIG. 9, the allowable torque change T2 depending on the vehicle speed V is referred to, and the motor torque command is limited based on the allowable torque change T2. According to the motor torque response limiting process, the response of the propulsive motor 17 is limited as no assistive electric current is supplied from the electric storage device 70. Consequently, the fuel cell 14 is free of a gas shortage and is prevented from being unduly deteriorated.

In step S5, a regeneration limiting feedback process is performed. Specifically, the regenerative threshold value calculator 110e (see FIG. 11) determines a provisional threshold value Wth2' for the allowable motor regenerative electric power upper limit value Wth2 from the second threshold value table 214 based on the difference $\epsilon 2$ between the system upper limit voltage V0 and the voltage V1. The regenerative threshold value calculator 110e then establishes a smaller one of the provisional threshold value Wth2' and the failure regenerative electric power limit value selectively set in step S3 as an allowable motor regenerative electric power upper limit value Wth2. According to the regeneration limiting feedback process, the maximum regenerative amount of the propulsive motor 17 is limited to prevent the voltage V1 on the first power supply line 72 from increasing excessively.

In step S6, a motor output limiting process is performed. Specifically, the electric power threshold value calculator 110d (see FIG. 10) determines a difference $\epsilon 1$ between a smaller one of the amount Wc of electric power that can be generated and the required amount Wr of electric power, and the amount W of electric power generated by the fuel cell 14. Based on the determined difference $\epsilon 1$, the electric power threshold value calculator 110d determines an allowable motor output electric power upper limit value Wth1 from the first threshold value table 212. According to the motor output limiting process, the output of the propulsive motor 17 is appropriately limited to avoid a gas shortage in the fuel cell 14, thereby preventing the fuel cell 14 from being unduly deteriorated. Step s6 is executed regardless of whether there is a converter failure or not. In the event of a converter failure, however, the output of the propulsive motor 17 is further limited as no assistive electric current is supplied from the electric storage device 70, thus avoiding a gas shortage in the fuel cell 14. After step S6, the control sequence shown in FIG. 12 is finished in the present cycle.

With the electric system 10, the fuel cell vehicle 12, and the method of supplying electric power according to the present embodiment, as described above, when a failure of the first DC-to-DC converter 74 is detected, the response of the electric power output from the fuel cell 14 is limited thereby to avoid a gas shortage in the fuel cell 14 even if there is no assistive electric current from the electric storage device 70, so that the fuel cell 14 is prevented from being unduly deteriorated. Because the response is limited, the amount of a fuel gas that is consumed is reduced, allowing the fuel cell vehicle 12 to travel a longer distance.

The first electric accessory 76 as the fuel cell accessory for operating the fuel cell 14 is supplied with electric power from the first power supply line 72, and is not supplied with electric power directly from the second power supply line 73 without the first DC-to-DC converter 74 interposed therebetween. Therefore, even if the first DC-to-DC converter 74 accidentally fails to perform its voltage increasing function or voltage lowering function, the first electric accessory 76 is supplied with electric power from the fuel cell 14 through the first power supply line 72, allowing the fuel cell vehicle 12 to continue travelling a longer distance or a longer period of time.

In this case, the electric storage device 70 and the lead battery 92 are not charged. However, since the second electric accessory 78 consumes less electric power than the first electric accessory 76, the electric storage device 70 and the lead battery 92 are discharged at a limited rate and keep operating for a considerably long period of time. Specifically, since the propulsive motor 17 is connected to the first power supply line 72 through the inverter 16, the propulsive motor 17 is mainly supplied with electric power from the fuel cell 14. In the event of a converter failure, therefore, the propulsive motor 17 is energized regardless of the storage capacity of the electric storage device 70. Therefore, the electric storage device 70 may have its capacity determined without regard to a converter failure, and may be reduced in size. Basically, the electric storage device 70 may be of a small capacity that is large enough to energize the second electric accessory 78 and also to actuate the air compressor 42 when it starts to operate.

In the above description, failures of the first DC-to-DC converter 74 are not categorized into those in the voltage increasing mode and those in the voltage decreasing mode. However, failures of the first DC-to-DC converter 74 may be determined separately in the voltage increasing mode and the voltage decreasing mode. If the first DC-to-DC converter 74 fails only in the voltage increasing mode, then a regenerative process for storing regenerative electric power in the electric storage device 70 may be continued when the first DC-to-DC converter 74 is in the voltage decreasing mode. Conversely, if the first DC-to-DC converter 74 fails only in the voltage decreasing mode, then an assistive electric current may be supplied from the electric storage device 70 when the first DC-to-DC converter 74 is in the voltage increasing mode, and a limit value for the torque generated by the propulsive motor 17 may be set to the same value as when the first DC-to-DC converter 74 is normal.

Although a certain preferred embodiment of the present invention has been shown and described in detail, it should be understood that various changes and modifications may be made therein without departing from the scope of the appended claims.

What is claimed is:

1. A fuel cell vehicle for being propelled by a propulsive motor, said fuel cell vehicle having an electric system in which a fuel cell and an electric storage device are connected in parallel to each other with respect to the propulsive motor and connected to the propulsive motor through a power converter, comprising:
   a DC-to-DC converter connected closer to the electric storage device than a junction where the fuel cell and the electric storage device are connected in parallel to each other;
   reactive gas supply means for supplying a reactive gas to said fuel cell;
   failure detecting means for detecting a failure of said DC-to-DC converter;
   response limiting means for limiting the response of electric power output from said fuel cell when said failure detecting means detects a failure of said DC-to-DC converter; and
   regenerative electric power limiting means for limiting regenerative electric power of said propulsive motor to a value equal to or smaller than a prescribed failure regenerative electric power limit value upon the failure of said DC-to-DC converter.

2. A fuel cell vehicle according to claim 1, wherein said response limiting means sets an allowable output change upon the failure of said DC-to-DC converter to a value smaller than an allowable output change when said DC-to-DC converter is normal.

3. A fuel cell vehicle according to claim 2, wherein said allowable output change comprises an allowable torque change of said propulsive motor.

4. A fuel cell vehicle according to claim 1, wherein said reactive gas supply means comprises:
   a pump for delivering said reactive gas; and
   an electric motor for actuating said pump;
   said electric motor being supplied with electric power from a power supply line having said junction.

5. A fuel cell vehicle according to claim 1, wherein said regenerative electric power limiting means comprises:
   means for calculating an allowable motor regenerative electric power upper limit value of said propulsive motor based on a voltage in said electric system; and
   means for limiting the regenerative electric power of said propulsive motor to a value equal to or smaller than a smaller one of said failure regenerative electric power limit value and said allowable motor regenerative electric power upper limit value.

6. A fuel cell vehicle according to claim 1, further comprising:
   vehicle accessory electric power limiting means for limiting at least part of electric power consumed by a vehicle accessory upon the failure of said DC-to-DC converter.

7. A fuel cell vehicle according to claim 6, wherein said vehicle accessory comprises an electrically operated air conditioner motor.

8. A fuel cell vehicle for being propelled by a propulsive motor, said fuel cell vehicle having an electric system in which a fuel cell and an electric storage device are connected in parallel to each other with respect to the propulsive motor and connected to the propulsive motor through a power converter, comprising:
   a DC-to-DC converter connected closer to the electric storage device than a junction where the fuel cell and the electric storage device are connected in parallel to each other;
   reactive gas supply means for supplying a reactive gas to said fuel cell;
   failure detecting means for detecting a failure of said DC-to-DC converter;
   protection control means for protecting said fuel cell when said failure detecting means detects a failure of said DC-to-DC converter; and
   regenerative electric power limiting means for limiting regenerative electric power of said propulsive motor to a value equal to or smaller than a prescribed failure regenerative electric power limit value upon the failure of said DC-to-DC converter.

9. A fuel cell vehicle according to claim 8, wherein said regenerative electric power limiting means comprises:
   means for calculating an allowable motor regenerative electric power upper limit value of said propulsive motor based on a voltage in said electric system; and
   means for limiting the regenerative electric power of said propulsive motor to a value equal to or smaller than a smaller one of said failure regenerative electric power limit value and said allowable motor regenerative electric power upper limit value.

* * * * *